(12) United States Patent
Oh

(10) Patent No.: US 7,391,778 B2
(45) Date of Patent: Jun. 24, 2008

(54) LABEL SWITCHING ROUTER HAVING INTERNAL CHANNEL SHARE FUNCTION OVER ATM, AND METHOD FOR SHARING INTERNAL CHANNEL USING THE SAME

(75) Inventor: Kwang-Ho Oh, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 764 days.

(21) Appl. No.: 10/769,923

(22) Filed: Feb. 3, 2004

(65) Prior Publication Data

US 2004/0160958 A1    Aug. 19, 2004

(30) Foreign Application Priority Data

Feb. 15, 2003    (KR) .................. 10-2003-0009644

(51) Int. Cl.
H04L 12/28    (2006.01)
H04L 12/56    (2006.01)

(52) U.S. Cl. .................. 370/395.3; 370/395.31; 370/395.51; 370/397; 370/399; 370/409

(58) Field of Classification Search .............. 370/395.1, 370/395.52, 395.6, 395.3, 397, 399, 400, 370/395.51
See application file for complete search history.

(56) References Cited

U.S. PATENT DOCUMENTS

| | | | |
|---|---|---|---|
| 6,205,488 B1 | 3/2001 | Casey et al. | |
| 6,343,326 B2 | 1/2002 | Acharya et al. | |
| 6,512,744 B1 * | 1/2003 | Hughes et al. | 370/232 |
| 6,553,000 B1 | 4/2003 | Ganesh et al. | |
| 6,628,617 B1 | 9/2003 | Karol et al. | |
| 6,650,642 B1 | 11/2003 | Sugai et al. | |
| 6,711,167 B1 * | 3/2004 | Ikeda et al. | 370/395.1 |
| 6,987,762 B2 * | 1/2006 | Shiota | 370/389 |
| 7,006,504 B2 * | 2/2006 | Yoon et al. | 370/395.6 |
| 7,136,374 B1 * | 11/2006 | Kompella | 370/352 |
| 7,197,033 B2 * | 3/2007 | Reeves et al. | 370/389 |
| 2003/0043792 A1 | 3/2003 | Carpini et al. | |
| 2003/0053464 A1 | 3/2003 | Chen et al. | |
| 2003/0147346 A1 | 8/2003 | Kanakubo | |
| 2003/0152024 A1 | 8/2003 | Yang et al. | |
| 2003/0161264 A1 | 8/2003 | Ho et al. | |

* cited by examiner

*Primary Examiner*—Ricky Q. Ngo
*Assistant Examiner*—DeWanda Samuel
(74) *Attorney, Agent, or Firm*—Robert E. Bushnell, Esq.

(57) ABSTRACT

A label switching router having an internal channel share function over an asynchronous transfer mode that sets up an internal channel in advance of the external channel and shares it when an external channel needs to be set up, and a method for sharing an internal channel using the same. The label switching router includes a forwarding engine for setting up a label switched path by using a signaling protocol, extracting an egress forwarding engine number and a channel identifier, allocating an extension tag, searching a previously-set internal channel, forming a forwarding information base/label information base including the previously-set internal channel identifier and the extension tag, adding a header having the internal channel identifier and extension tag to a received internet protocol packet by referring to the forwarding information base/label information base, and forwarding the internet protocol packet, and a merging unit for receiving label switched path set information from a peer forwarding engine, forming an extension information base/merging table where an internal channel identifier is mapped to an extension tag, performing merging when receiving an internet protocol packet having the extension tag, extracting the extension tag, mapping the extension tag to the internal channel identifier, and forwarding the internet protocol packet to an internal channel having the mapped internal channel identifier.

17 Claims, 10 Drawing Sheets

LABEL SWITCHING ROUTER HAVING INTERNAL CHANNEL SHARE FUNCTION OVER ATM, AND METHOD FOR SHARING INTERNAL CHANNEL USING THE SAME

CLAIM OF PRIORITY

This application makes reference to, incorporates the same herein, and claims all benefits accruing under 35 U.S.C. §119 from an application entitled "LABEL SWITCHING ROUTER HAVING INTERNAL CHANNEL SHARE FUNCTION OVER ATM, AND METHOD FOR SHARING INTERNAL CHANNEL USING THE SAME" earlier filed in the Korean Intellectual Property Office on 15 Feb. 2003 and there duly assigned Serial No. 2003-9644.

BACKGROUND OF THE INVENTION

1. Field of the Invention

The present invention relates to a label switching router (LSR) having an internal channel share function over an ATM which sets up internal channels in advance and shares internal channels when an external channel needs to be set up, and a method for sharing an internal channel using the same.

2. Description of the Related Art

In general, an Multiprotocol Label Switching network (or MPLS network) improves transmission of layer 3 (L3) packet by an internet protocol (or IP) header used in an existing local area network/wide area network (LAN/WAN), and thus efficiently and rapidly transmits the L3 packets by using a new label stack having a short length, namely an MPLS header. The connection structure of the MPLS network includes an end system for performing a router function, and LSRs classified into label edge routers (LER) positioned on contact points to the existing network, and core LSRs positioned in the MPLS network according to their functions.

An MPLS control protocol stack for supporting MPLS functions includes a label distribution protocol (LDP) layer for transmitting/receiving label values between the LSRs. An MPLS, also called a label switch path or LSP, is set up to transmit the L3 packets by the corresponding LDP layer according to the MPLS. In the ATM MPLS network, when the L3 packet is transmitted from the existing network such as the LAN through ATM (or Asynchronous Transfer Mode) access such as an IP over ATM (or IPOA) of the end system, an MPLS layer of an ingress or incoming ATM-LER positioned on the boundary of the ATM MPLS network transforms the L3 packet into ATM cells, and transmits the ATM cells to a core ATM-LSR through an ATM LSP determined by an LDP layer. Identically to general ATM cell transmission, the core ATM-LSR transmits the ATM cells to an egress or exiting ATM-LER by VPI/VCI (or virtual path identifier/virtual channel identifier) switching of the ATM cells in an ATM layer. The egress ATM-LER assembles the ATM cells into L3 packet and transmits the ATM cells to the existing network through the end system.

In order to set up an external channel such as the LSP or IPOA PVC (or permanent virtual circuit), the virtual path (or VP) tunnels are set up in the form of a VP full mesh in the ATM MPLS network. That is, the ATM MPLS network sets up the VP tunnels by using the internal channel set process due to the external channel. When one external channel LSP or IPOA is set up, the internal channels must then be connected as many as the value obtained by subtracting the set Forwarding Engines (or FEs) 200 from the whole FEs 200. Accordingly, when N LSPs are set up, a number of channels required in the ATM MPLS network is represented by following formula 1:

Network channel number=external channel number $(N)+N*(FE \text{ number}-1)$ <Formula 1>

Considering the mapping relations between the internal and external channels, the general internal channel allocation restricts capacity of the ATM MPLS network. For example, when 16K of LSP and 16K of IPOA PVC are needed per 622 Mbps of FE in 10 G of MPLS network, 512K of channel capacity is required to set up channels. However, channel capacity per 622 Mbps is restricted to 64K, which influences the ATM MPLS network.

SUMMARY OF THE INVENTION

It is therefore an object of the present invention to provide an improved LSR.

It is also an object of the present invention to provide an improved method for switching ATM data through a network having LSR's.

It is also an object of the present invention to eliminate the consumption of unnecessary resources in a switch when possible.

It is further an object to provide a network and an method for switching data through the network that is faster, more efficient and has a broader bandwidth.

It is also an object of the present invention to share an internal channel to transfer data between an internal switch and a destination when the data originates in more than one source.

These and other objects may be achieved by having the internal channels in an MPLS network already set up before any data needs to be transferred and before an external channel arrives at the network. In addition, this invention allows for the sharing of the internal channels of the network thereby enhancing speed. By sharing channels instead of using many channels, resources are conserved in that unnecessary channels do not have to be set up.

Provided is a label switching router having an internal channel share function over an ATM which sets up an internal channel in advance in an ATM MPLS network and shares the internal channel when an external channel needs to be set up. Provided also is a method for sharing an internal channel using the same.

There is provided a label switching router having an internal channel share function over an ATM, the label switching router having a forwarding engine for setting up a label switched path by using a signaling protocol, extracting an egress forwarding engine number and a channel ID, allocating an extension tag, searching a previously-set internal channel, forming a forwarding information base/label information base (FIB/LIB) including the previously-set internal channel ID and the extension tag, adding a header having the internal channel ID and extension tag to a received IP packet by referring to the forwarding information base/label information base, and forwarding the IP packet. The label switching router further having a merging unit for receiving label switched path set information from a peer forwarding engine, forming an extension information base/merging table (EIB/MT) where an internal channel ID is mapped to an extension tag, performing merging when receiving an IP packet having the extension tag, extracting the extension tag, mapping the extension tag to the internal channel ID, and forwarding the IP packet to an internal channel having the mapped internal channel ID. A single channel is shared and used to transmit data originating from more than one source and going to a single destination instead of having a separate channel for each originating source.

There is also provided a method for sharing an internal channel by using a label switching router over an ATM, the method starting out with a first step where a forwarding engine sets up a label switched path by using a signaling protocol, extracts an egress forwarding engine number and a channel ID, allocates an extension tag, and forms a forwarding information base/label information base table by using a previously-set internal channel. The second step being where the forwarding engine adds a header having the internal channel ID and extension tag to a received IP packet by referring to the forwarding information base/label information base, and forwards the IP packet. The third step being where a merging unit receives label switched path set information from a peer (or ingress) forwarding engine, forms an extension information base/merging table where an internal channel ID is mapped in an extension tag. The method concludes with a fourth step where the merging unit forwards a received IP packet having the extension tag to an internal channel having the internal channel ID mapped to the extension tag by referring to the extension information base/merging table.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
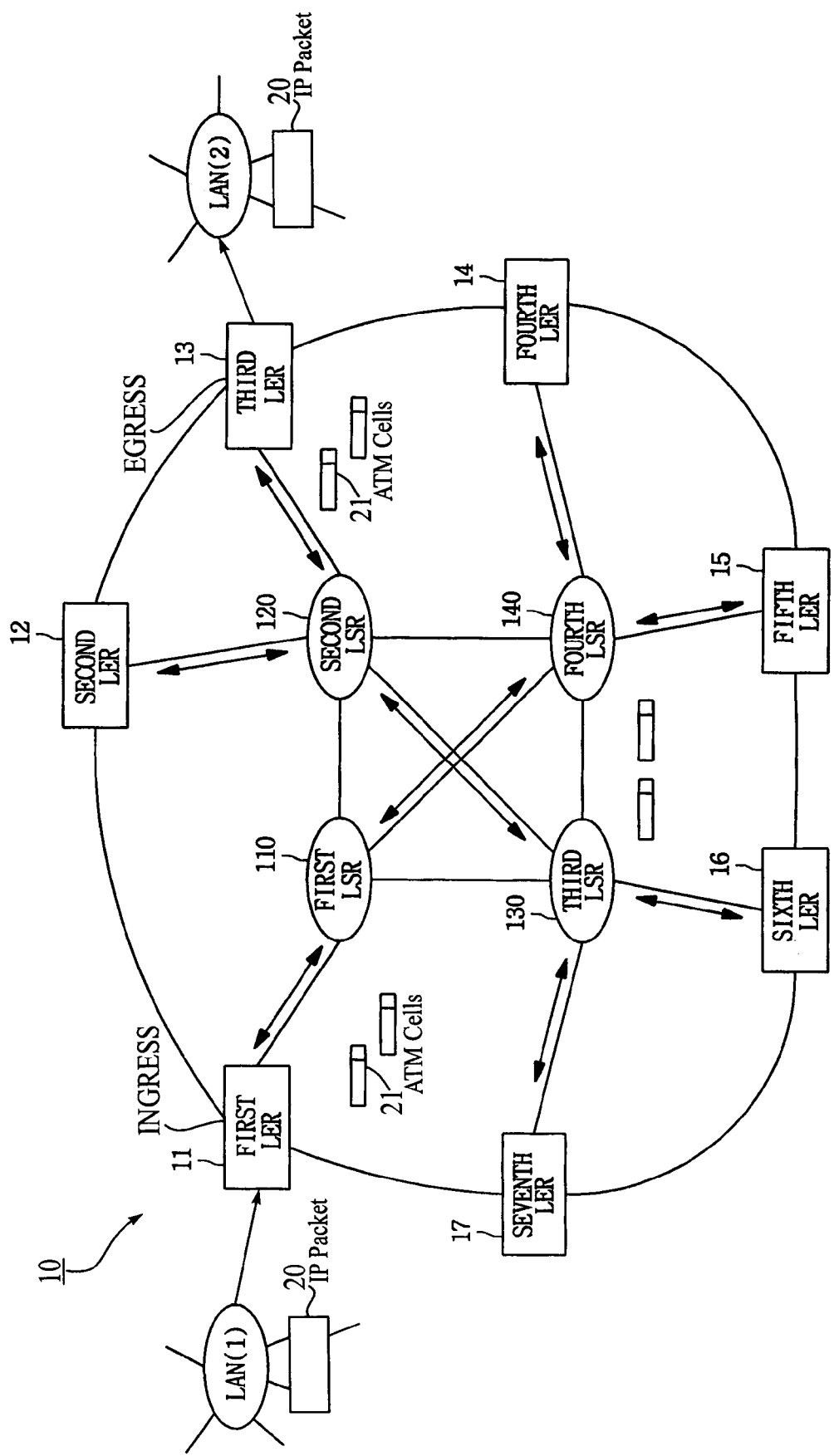
FIG. 1 is a structure diagram illustrating an ATM MPLS network.

Turning now to the figures, FIG. 1 is a structure diagram illustrating an ATM MPLS network 10. Referring to FIG. 1, an IP packet 20 entering the MPLS network 10 is transformed into ATM cells 21 in a first LER 11 which is an ingress LER. The transformed ATM cells 21 are then switched by ATM switches along an LSP path. The IP packet 20 is reassembled from the ATM cells 21 in a third LER 13 which is an egress LER, and the IP packet is outputted from the MPLS network 10.

In FIG. 1, IP routing functions of a router such as IP packet assembling/segmentation, IP header analysis and processing, and routing table lookup are performed once in each LER 11 and 13, and the ATM cells 21 are rapidly ATM switched in the MPLS network 10. In addition, a data transmission path is identical to a connectionless IP network path. A transmission side of two adjacent routers on one path is upstream Ru and a reception side is a downstream Rd. A path calculated by a routing protocol operated in each network element is an LSP path. Here, a protocol used between the network elements is an LDP. That is, when the LSP is set up by the LDP, the first LER 11, which is an ingress LER, analyzes a header of the IP packet 20, and determines an LSP according to the destination IP address. Thereafter, the first LER 11 segments the IP packet 20 into the ATM cells 21, and transmits the ATM cells 21 to a first LSR 110 which is a peer LSR by using a selected label as a VPI/VCI value. The first through fourth LSRs 110 through 140 transmit the IP packet to the third LER 13, which is an egress LER, by cell switching without assembling/segmenting the IP packet. The third LER 13 reassembles the input cells, analyzes an IP header, and performs L3 forwarding.

The LER's includes a plurality of line interface cards (LIC) for connecting the LER to an external environment (such as terminals or other systems). The LER's also include a plurality of forwarding engines (FE) for forwarding packets. Each of the LICs may include a variety of interfaces such as an ATM interface, Ethernet and frame relay. The external terminals or other systems can be connected to the LERs through the plurality of LICs in the form of various services. Such connections are connected to the FEs so that they can process the input packets and transmit them to destinations.

Figure 2:
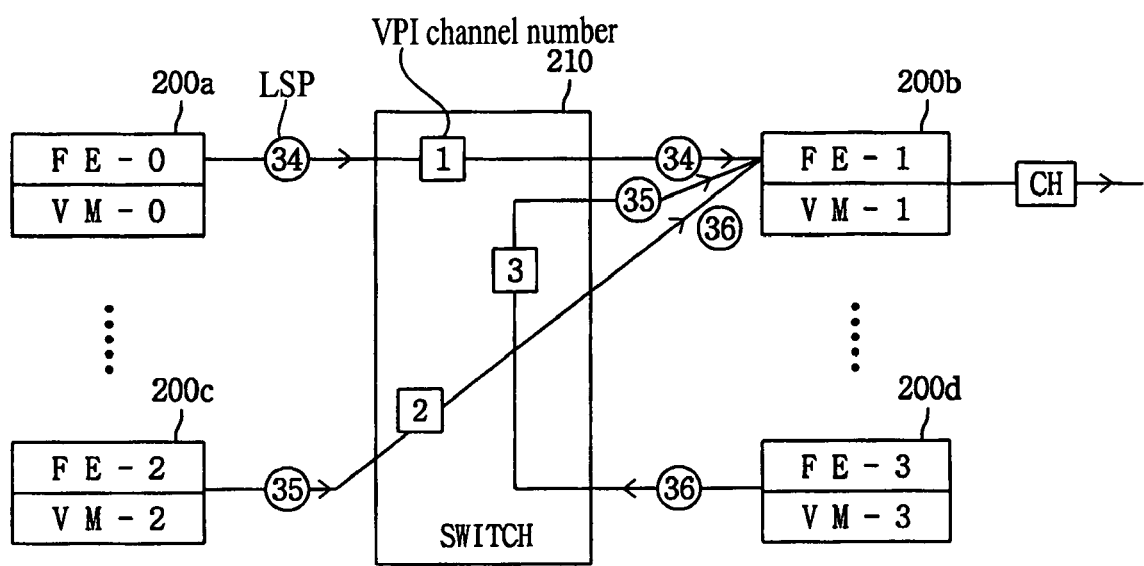
FIG. 2 is a concept diagram illustrating a general process for setting up an LSP.

On the other hand, when the MPLS LER/LSR over the ATM sets up the LSP through the MPLS network, a VP full mesh type internal channel must be determined between the FEs. Each FE must set up VPI channels of the whole FEs composing the ATM MPLS network. For example, as illustrated in FIG. 2, FE-1 200*b* must set up three LSPs (34, 35 and 36) for one channel (CH), the three paths being FE-0→FE-1, FE-2→FE-1 and FE-3→FE-1. In addition, four open channels 1, 2 3 and CH are opened in consideration of one IPOA PVC. As will be discussed later, this is unnecessary.

The process for setting up channels will now be explained. In initialization of the ATM MPLS network, virtual path (VP) tunnels are set up between the whole FEs in the ATM MPLS network by a general switch management protocol (GSMP). The VP tunnel information is registered in a VP mapping table of the MPLS LER. For example, as illustrated in FIG. 2, entry information such as FE-0, FE-1, VPI (1), FE-2, FE-1, VIP (2), FE-3, FE-1 and VPI (3) is registered in the VP mapping table of the FE-1 200*b*. After this registration, when receiving an LSP or IPOA PVC connection request, the MPLS LER then allocates channels, and searches VPI information connected to the FE-1 200*b* in the VP mapping table. The MPLS LER searches VPI values of FE-1, FE-0, VPI (1), VCI (4), FE-1, FE-2, VPI (2), VCI (5), FE-1, FE-3, VPI (3) and VCI (6), and rece values thereof from a VCI pool.

Figure 3:
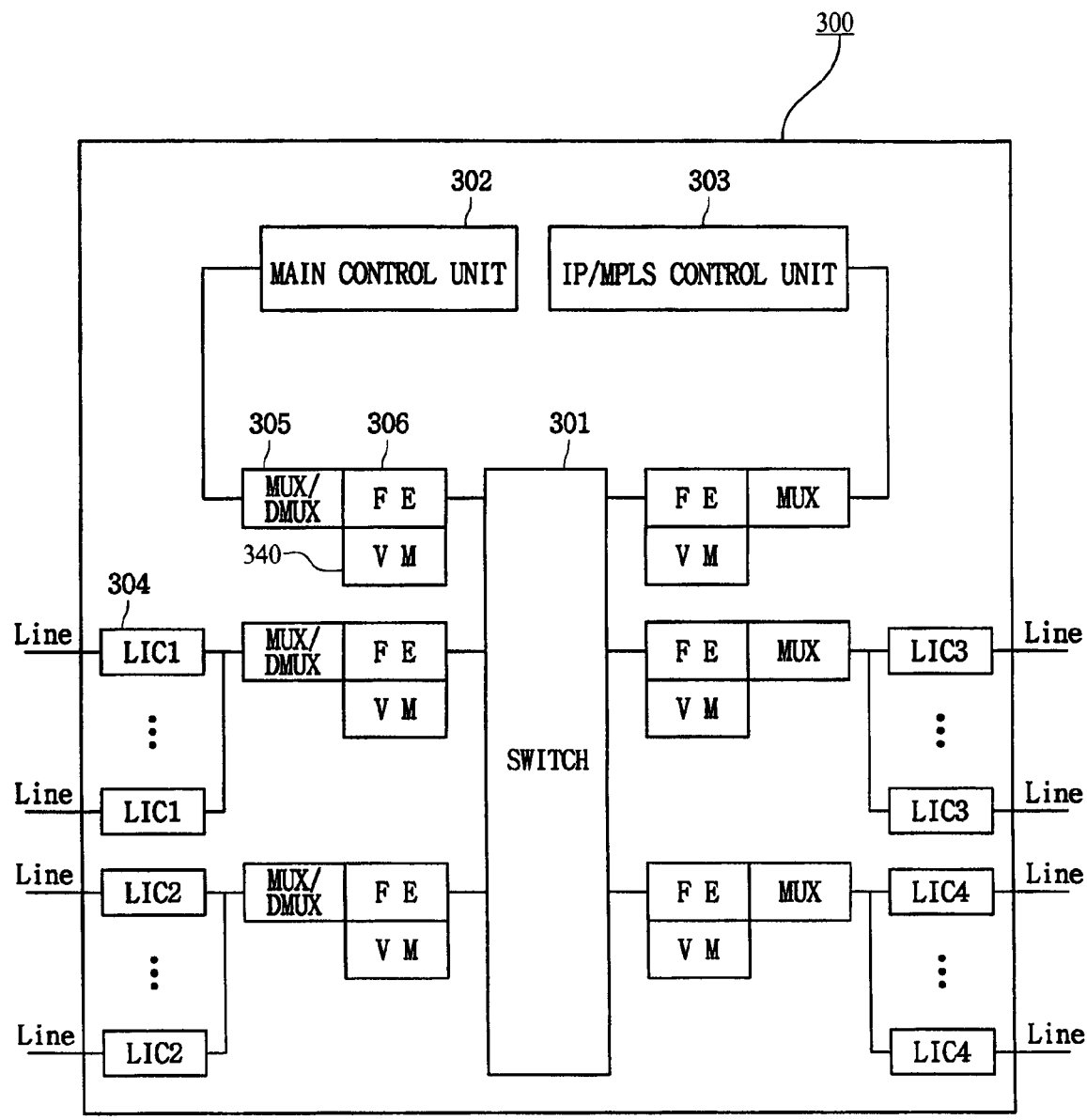
FIG. 3 is a structure diagram illustrating an ATM MPLS system having an internal channel share function according to the principles of the present invention.

Turning to FIG. 3, FIG. 3 is a structure diagram illustrating an ATM MPLS system 300 having an internal channel share function in according to the principles of the present invention. As illustrated in FIG. 3, the ATM MPLS system 300 having the internal channel share function includes a switch 301, a main control unit 302, an IP/MPLS control unit 303, LICs 304, MUX/DMUXes 305, FEs 306, and VC or virtual channel merging units (VM) 340.

The switch 301 switches ATM cells. The main control unit 302 controls software parts, namely call processing, maintenance/repair, charging and statistics. The LICs 304 match with external links, distinguish ATM data flows through a VPI/VCI, control traffic types and properties by ATM data flows, and transmit the ATM data flows to the switch 301.

Figure 4:
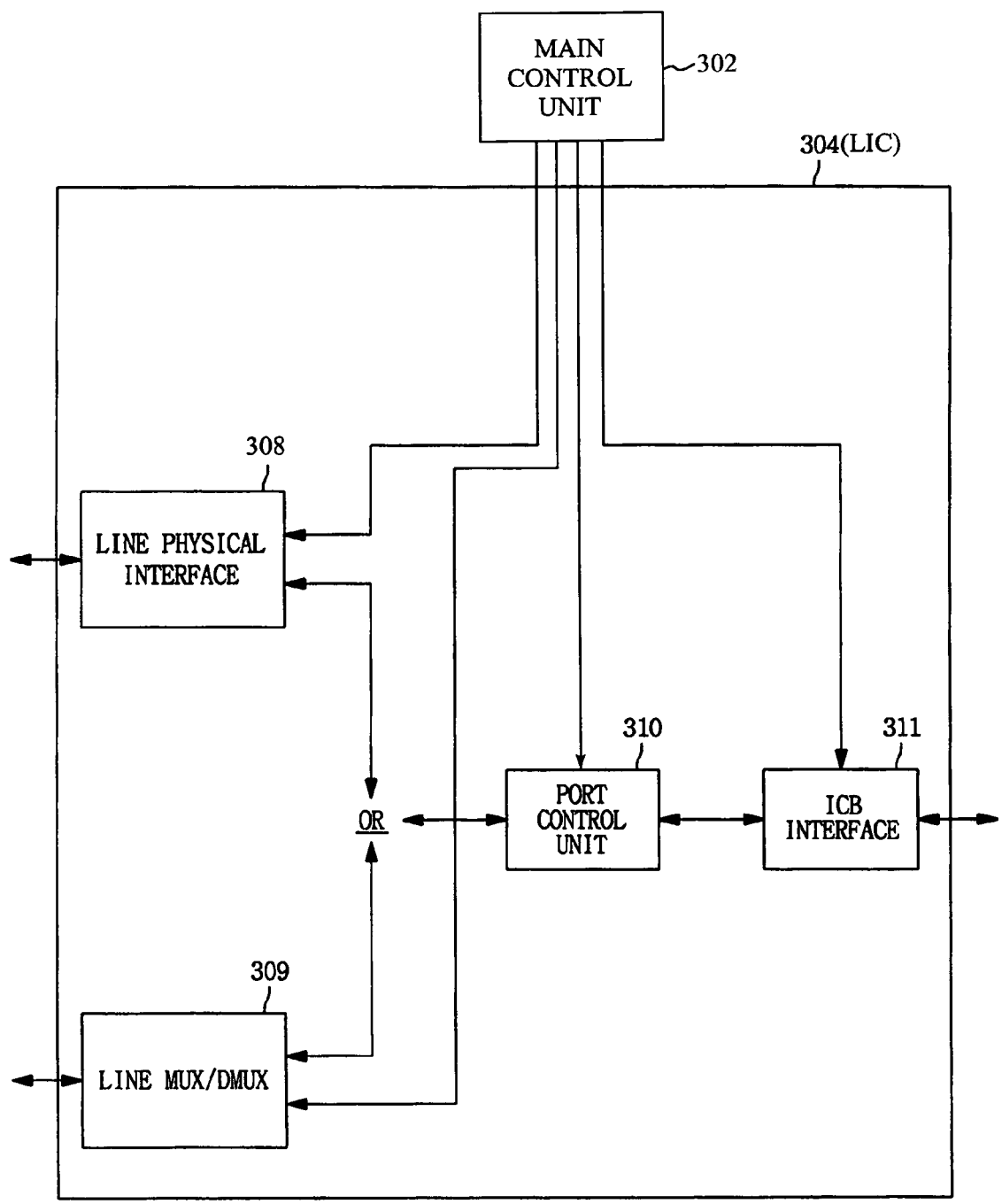
FIG. 4 is a block diagram illustrating an internal structure of a line interface card of FIG. 3.

Turning now to FIG. 4, FIG. 4 illustrates, in detail, an LIC 304 of FIG. 3. LIC 304 is made up of a line physical interface 308, a port control unit 310 and an Interface Control Block or ICB interface 311. Each of these devices are controlled by a main control unit 302. LIC 304 is further made up of LINE MUX/DMUX 309.

Figure 5:
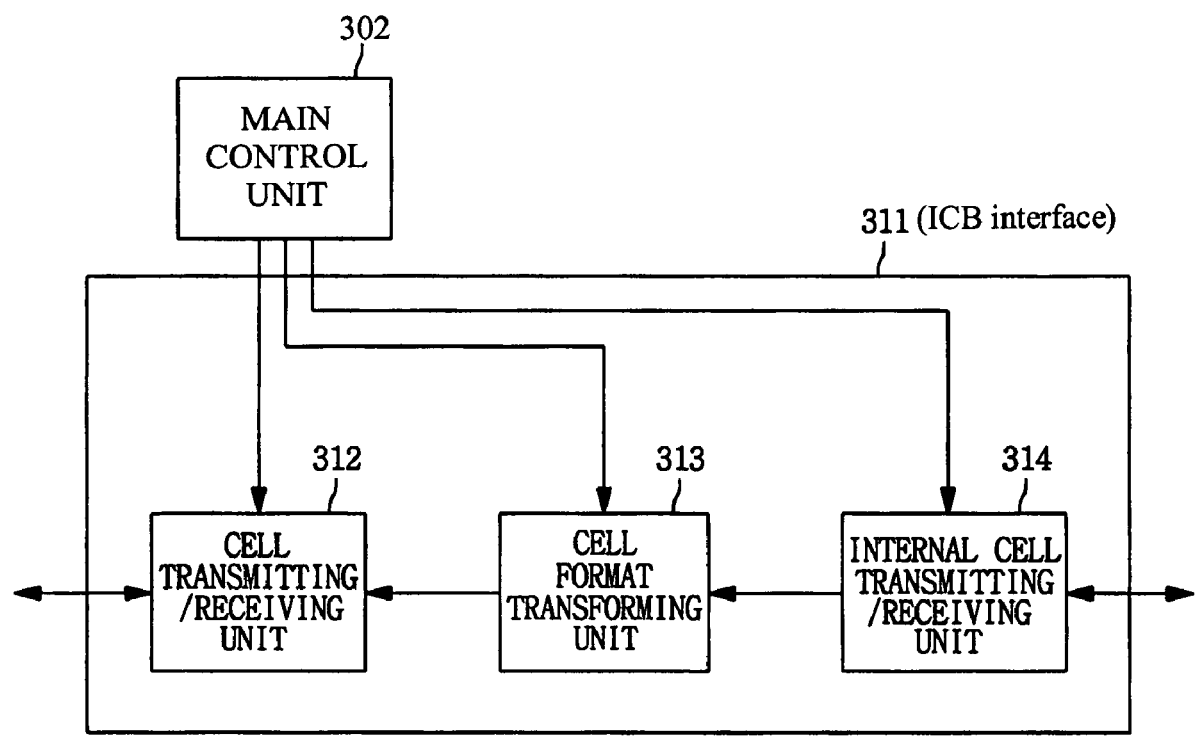
FIG. 5 is a block diagram illustrating an internal structure of an ICB interface of FIG. 4.

Turning now to FIG. 5, FIG. 5 illustrates, in detail, internal control block or ICB interface 311 of FIG. 4. As depicted in FIG. 5, the ICB interface 311 of the LIC 304 includes a cell transmitting/receiving unit 312, a cell format transforming unit 313 and an internal cell transmitting/receiving unit 314. Each device 312, 313 and 314 is controlled by the main control unit 302.

The cell transmitting/receiving unit 312 transmits/receives cells to/from the port control unit 310. When the port control unit 310 and the ICB interface 311 have different cell formats, the cell format transforming unit 313 equalizes the cell formats. The internal cell transmitting/receiving unit 314 transmits/receives cells format-transformed into internal cells. The cell format transforming unit 313 is required because most of the ATM exchanges transform standard ATM cells into internal cells and switch them. In addition to the fields of the standard ATM cell, the internal cell further includes a field for storing extra information such as an internal channel ID for switching in the exchange.

The line physical interface 308 of the LIC 304 of an ingress LER extracts the standard ATM cells from a transmission frame, and a line physical interface of an egress LER adds the standard ATM cells to the transmission frame, and transmits it. The cell format transforming unit 313 of the ICB interface 311 of the LIC 304 of the ingress LER processes the standard ATM cells according to a corresponding protocol, and transforms the ATM cells into internal cells. The cell format transforming unit 313 stores the internal channel ID mapped to the VPI/VCI value in the field of the ATM standard cell by referring to an input end table mapping the VPV/VCI value to the internal channel ID.

When the internal channel ID mapped to the VPI/VCI value of the standard ATM cells is stored in the fields of the internal cells, a cell format transforming unit of the egress LER processes the internal cells according to a corresponding protocol, and transforms them into the standard ATM cells. Here, the cell format transforming unit stores the VPI/VCI value mapped to the internal channel ID in the fields of the standard ATM cells by referring to an output end table mapping the internal channel ID to the VPI/VCI value. On the other hand, the IP/MPLS control unit 303 performs software functions such as an IP, routing protocol or RP, GSMP and LDP.

The FEs 306 assemble the IP packets and analyze the IP header of the IP packets. In addition, the FEs 306 generate labels according to the analyzed IP headers, add the labels to the IP packets, segment the IP packets into the ATM cells, and transmit the ATM cells to a succeeding node (for example, exchange or router). The FEs 306 are hardware boards for rapidly processing various traffic such as IP packets, point-to-point protocol or PPP packets and MPLS packets inputted to the ATM MPLS exchange, and transmitting them to corresponding output interfaces.

Figure 6:
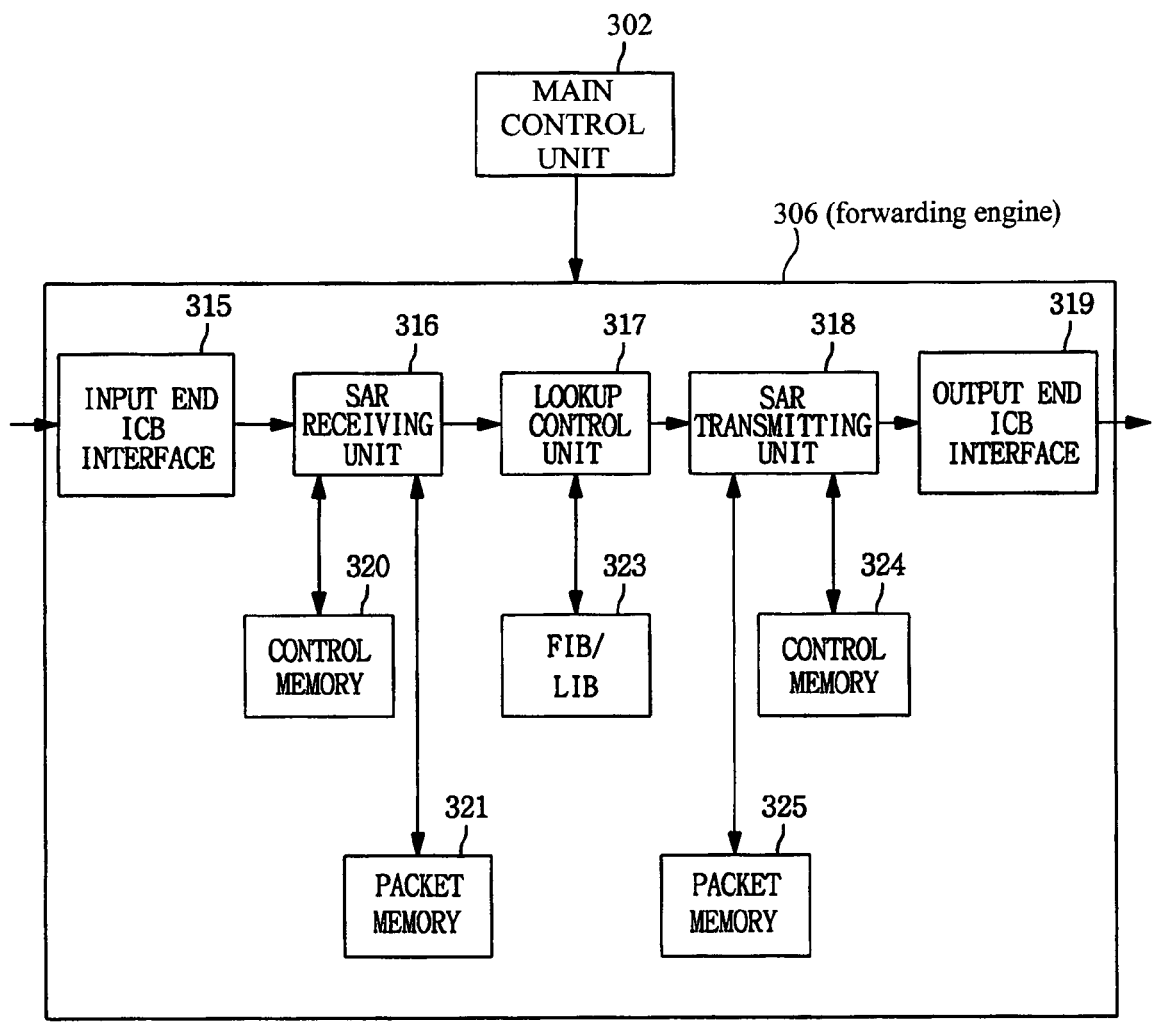
FIG. 6 is a block diagram illustrating an internal structure of a forwarding engine of FIG. 3.

Turning now to FIG. 6, FIG. 6 illustrates in detail forwarding engine (FE) 306 of FIG. 3. As illustrated in FIG. 6, the FE 306 includes an input end ICB interface 315, an SAR (or segmentation and reassembly or just segmentation) receiving unit 316, a lookup control unit 317, an FIB/LIB 323, an SAR transmitting unit 318, a control memory 320, a packet memory 321 of the SAR receiving unit 316, a control memory 324, a packet memory 325 of the SAR transmitting unit 318, and an output end ICB interface 319. The control memories 320 and 324 store SAR control information, and the packet memories 321 and 325 store received packets. The input end ICB interface 315 transforms the internal cell into the standard ATM cells to perform SAR, and copies and stores an internal channel access ID stored in the fields of the internal cells in specific fields of the standard ATM cells. The SAR receiving unit 316 reassembles the standard ATM cells having the same internal access ID to generate the IP packet, and transmits the IP packet to the lookup control unit 317.

In addition to the internal channel ID information for routing between the FEs 306, an extension tag must be set up in the FIB/LIB 323 of the FE 306 of the ingress LER to share the internal channel. The internal channel ID serves to distinguish internal channels set up between the FE 306 of the ingress LER and the FEs of the egress LER. In the related art, different internal channel IDs are allocated according to an external VPI/VCI, and thus a plurality of internal channel IDs are set up between the FEs of the ingress LER and the FEs of the egress LER. However, according to the principles of the present invention, the internal channel ID is not newly set up when the external VPI/VCI is set up. Instead, in the present invention, a previously established internal channel ID is used, and the external VPI/VCI is distinguished by using the extension tag (which will later be explained with reference to FIG. 8). Accordingly, when the external VPI/VCI is set up, the internal channel is not newly set up but routed to the same path by using the previously-set internal channel ID, which extends an available bandwidth. The extension tag is mapped to the newly-set external VPI/VCI, and the VPI/VCI mapped to the extension tag is designated in an extension information base/merging table (EIB/MT) 335 of the VC merging unit or VM 340 of the egress LER.

The lookup control unit 317 reads the IP address, the mapped internal channel ID and extension tag, and the label from the FIB/LIB 323, performs IP lookup for L3 switching for adding them to the header of the IP packet, and transmits the IP packet to the SAR transmitting unit 318. The SAR transmitting unit 318 segments the IP packet to reproduce the standard ATM cells storing the internal channel ID in their specific fields. The output end ICB interface 319 transforms the standard ATM cells into the internal cells, and copies the internal access ID stored in the fields of the standard ATM cells to the fields of the internal cells. In the MPLS system using the ATM exchange, when a data rate of one port which is a basic unit of the switch 301 is greater than a data rate of one LIC, the MUX 305 combines a plurality of LIC data streams to form one switch port-sized data stream. The VMs 340 receive the IP packet having the capsulated extension tag from the FEs 306, extract the extension tag, confirm the internal channel according to the extension tag, and transmit the IP packet to the internal channel. The external channel information corresponding to the extension tag must be managed in a connection extension information base/merging table (EIB/MT) 335 of the VM 340.

Figure 7:
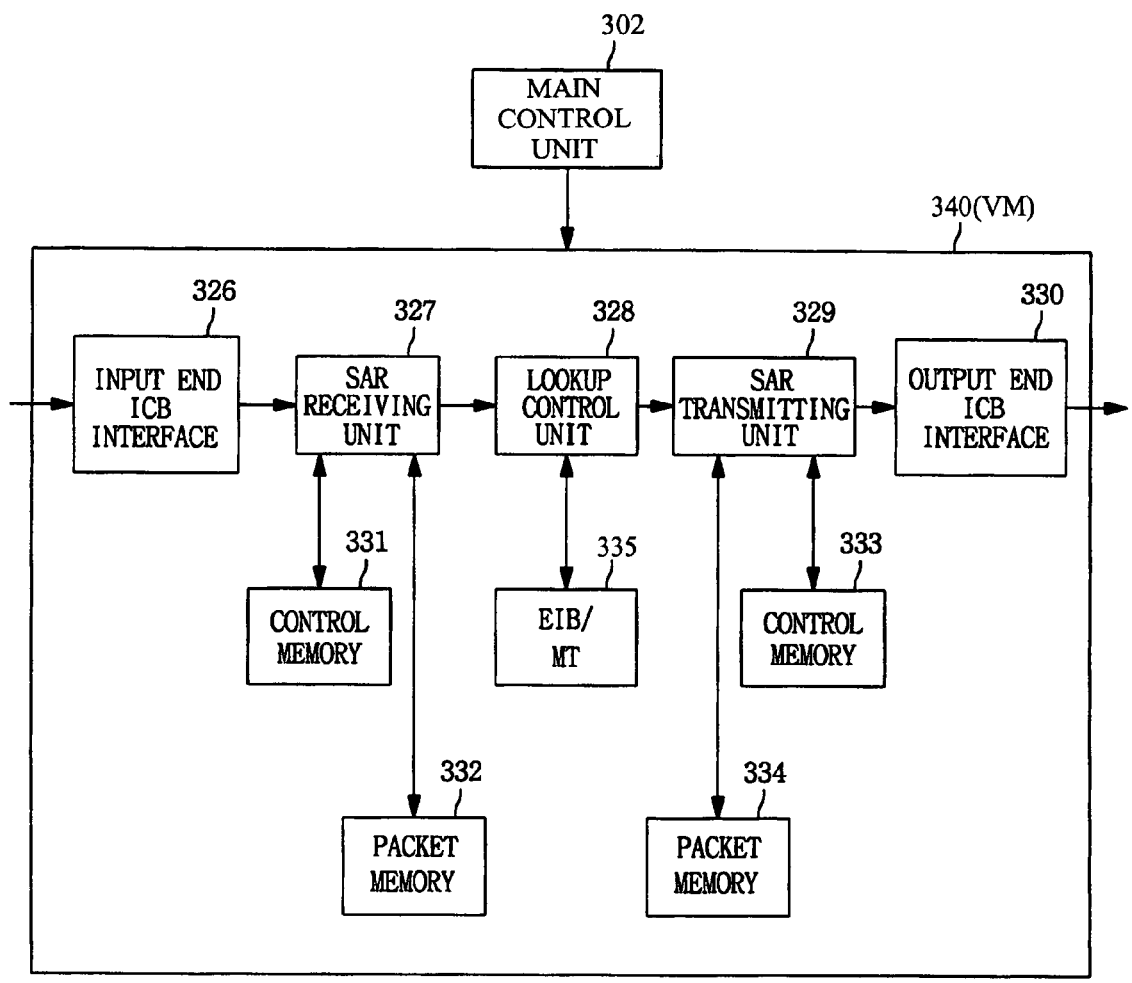
FIG. 7 is a block diagram illustrating an internal structure of a merging unit of FIG. 3.

Turning now to FIG. 7, FIG. 7 illustrates in detail VM 340 of FIG. 3. The VM 340 includes an input end ICB interface 326, an SAR receiving unit 327, a lookup control unit 328, an EIB/MT 335, an SAR transmitting unit 329, a control memory 331 and a packet memory 332 of the SAR receiving unit 327, a control memory 333 and a packet memory 334 of the SAR transmitting unit 329, and an output end ICB interface 330. The control memories 331 and 333 store SAR control information, and the packet memories 332 and 334 store received packets. The input end ICB interface 326 transforms the internal cells into the standard ATM cells to perform SAR, and copies and stores the internal channel access ID stored in the fields of the internal cells in specific fields of the standard ATM cells. The SAR receiving unit 327 reassembles the standard ATM cells having the same internal access ID to generate the IP packet, and transmits the IP packet to the lookup control unit 328. The lookup control unit 328 confirms the extension tag of the IP packet, reads the mapped internal channel ID, stores it in a corresponding field of the IP packet, and transmits the IP packet to the SAR transmitting unit 329. The SAR transmitting unit 329 segments the IP packet to reproduce the standard ATM cells storing the internal channel ID in their specific fields. The output ICB interface 330 transforms the standard ATM cells into the internal cells, and copies the internal access ID stored in the fields of the standard ATM cells to the fields of the internal cells.

A cell format transforming unit (not illustrated) which is a succeeding unit of the VM 340 X of the egress LER processes the internal cells according to a corresponding protocol, and transforms the internal cells into the standard ATM cells. Here, the cell format transforming unit stores the VPI/VCI value mapped to the internal channel ID in the fields of the ATM standard cells by referring to an output end table mapping the internal channel ID to the VPI/VCI value. Thereafter, a line physical interface (not illustrated) of the egress LER adds the standard ATM cells to a transmission frame, and transmits it.

Figure 8:
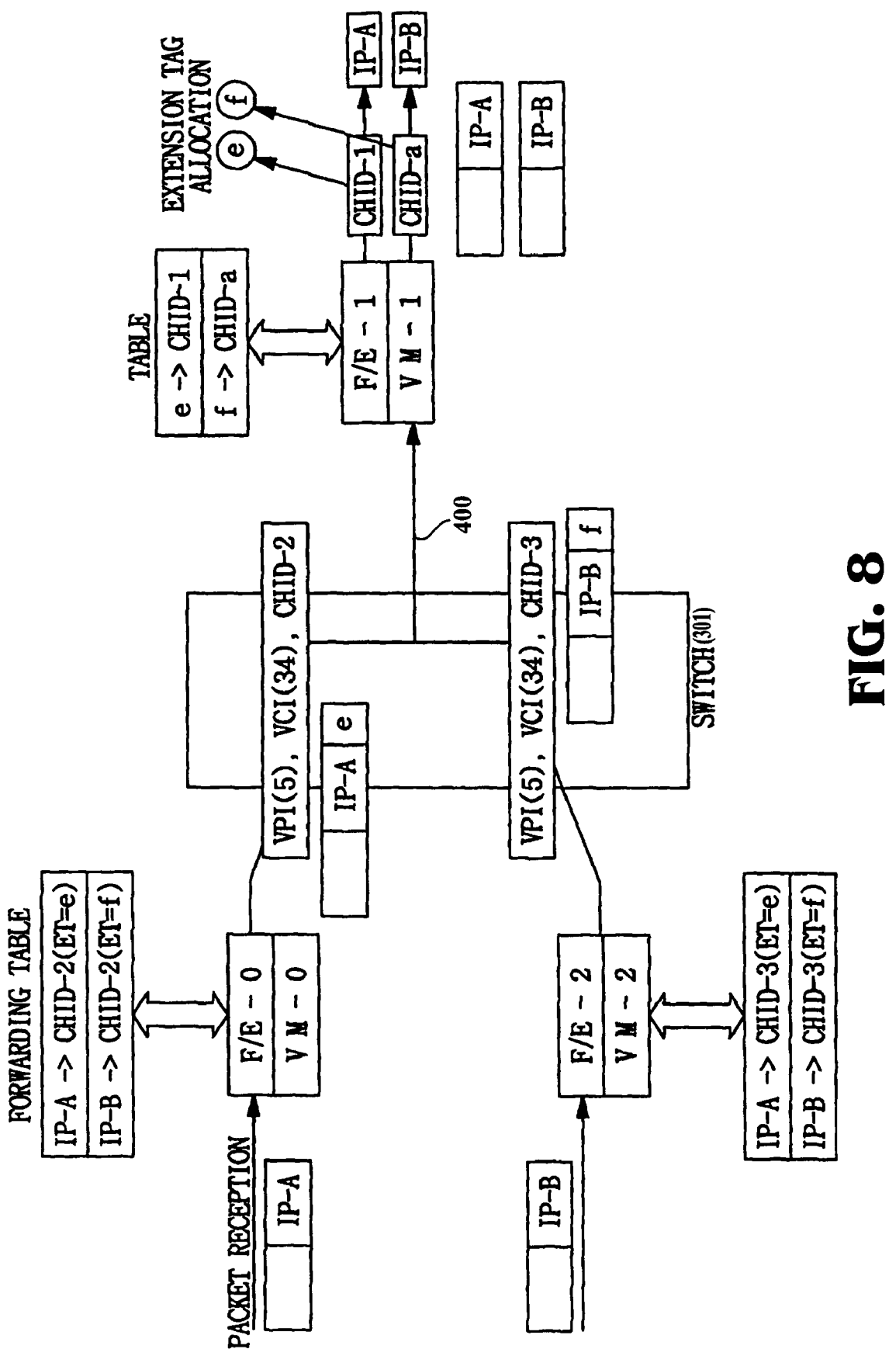
FIG. 8 is a concept diagram illustrating a process for setting up an LSP according to the principles of the present invention.

FIG. 8 is a concept diagram illustrating the method for sharing the internal channel in the ATM MPLS network according to the principles of the present invention. The main control unit 302 registers the LSP having a destination address (for example, IP-A, IP-B) by the GSMP. The main control unit 302 searches the FE number of the egress LER from the registered LSP information, and also searches the internal channel ID (used by the FE of egress LER to externally transmit the ATM cells) corresponding to the destination IP address to which the FE of the egress LER intends to transmit cells. In addition to the FE number of the egress LER and the internal channel ID, the main control unit 302 extracts and manages the VPI/VCI.

Thereafter, the main control unit 302 receives the extension tag for the internal channel ID used by the egress FE to transmit the ATM cells. Here, the main control unit 302 receives an extension tag that has not been allocated to the other channel IDs. For example, in the case of the IP packet having the destination IP address of IP-A, when the FE number of the output channel is '1' and the channel ID is '1' in the LSP information, if 'e' has not been allocated to the other channel IDs having the FE number of '1', the main control unit 302 of the ingress LER receives 'e' for the extension tag indicating the destination IP-A. Similarly, in the case of the IP packet having the destination IP address of IP-B, when the FE number is '1' and the channel ID is 'a', if 'f' has not been allocated to the other channel IDs having the FE number of '1', the main control unit 302 receives 'f' for an extension tag indicating the destination IP-B.

Here, the FEs of the ingress LER have the same egress FE, and use the same extension tag for the destination IP address from the egress FE to the same internal channel. Therefore, when the egress FE is '1' and the channel ID is '1', the FE-2 control unit receives the same extension tag 'e'. Also, when the egress FE is '1' and the channel ID is 'a', the FE-2 control unit receives the same extension tag 'f'.

The main control unit 302 of the router searches the previously-set internal channel to the corresponding egress FE in the VP mapping table. For example, when the channel ID of the previously-set internal channel from FE-0 to FE-1 is '2', the main control unit 302 sets up the channel ID to be '2', designates the allocated extension tag, and generates a forwarding information base/label information base (FIB/LIB) 323 for a newly-set LSP path.

In addition, when the channel ID of the previously-set internal channel from FE-2 to FE-1 is '3', the main control unit 302 sets up the channel ID to be '3', designates the extension tag, and generates a forwarding information base/label information base FIB/LIB 323 for a newly-set LSP path.

Thereafter, the egress main control unit 302 receives the LSP set information from the main control unit 302, and generates and stores an extension information base/merging table EIT/MT 335. In the extension information base/merging table EIT/MT 335, the internal channel ID is mapped to the extension tag. For example, when the extension tag is 'e', the channel ID is mapped to '1', and when the extension tag is 'f', the channel ID is mapped to 'a'.

The main control unit 302 generates a merging table for the internal channel ID, and stores it in the mapping table. For example, the internal channel having the internal channel ID of '2' is mapped to the internal channel having the internal channel ID of '1', and the internal channel having the internal channel ID of '3' is mapped to the internal channel having the internal channel ID of 'a'.

On the other hand, when the procedure of setting up the LSP is finished, the FE of the ingress LER receiving the IP packet looks up the forwarding information base/label information base FIB/LIB 323, adds the allocated internal channel ID, the extension tag and the label to the IP packet, and transmits it to the channel having the internal channel ID. The IP packet is segmented to ATM cells, and transmitted to the internal channel. The switch performs switching according to the internal channel ID. For example, when FE-0 receives the IP packet having the destination IP address of IP-A, it looks up the forwarding information base/label information base FIB/LIB 323, adds the internal channel ID of '2', the extension tag of 'e' and the label to the IP packet, segments the IP packet to generate a plurality of ATM cells having the internal channel ID of '2' and the extension tag of 'e', and transmits them to the internal channel having the internal channel ID of '2'. Likewise, when FE-2 receives the IP packet having the destination IP address of IP-B, it looks up the forwarding information base/label information base FIB/LIB 323, adds the internal channel ID of '3', the extension tag of 'f' and the label to the IP packet, segments the IP packet to generate a plurality of ATM cells having the internal channel ID of '3' and the extension tag of 'f' and transmits them to the internal channel having the internal channel ID of '3'.

The FE of the egress LER merges the ATM cells from the same internal channel ID, and searches the internal channel ID to which the ATM cells mapped to the extension tag will be transmitted by referring to the extension information base/merging table EIB/MT 335. Thereafter, the FE of the egress LER transmits the ATM cells having the same extension tag to the internal channel having the internal channel ID. For example, when FE-1 receives the ATM cells having the internal channel ID of '2', the extension tag of 'e' and the destination IP address of 'IP-A' from FE-0, it confirms that the internal channel ID is '1' through the extension information base/merging table EIB/MT 335 by referring to the extension tag of 'e', and transmits the ATM cells to the channel having the internal channel ID of '1'. In the case that FE-1 receives the ATM cells having the internal channel ID of '3', the extension tag of 'f' and the destination IP address of 'IP-B' from FE-2, it confirms that the internal channel ID is 'a' through the extension information base/merging table EIB/MT 335 by referring to the extension tag of 'f', and transmits the ATM cells to the channel having the internal channel ID of 'a'.

Each FE forwards data to be transferred to a corresponding switch, and switch block 301 transfers received packets to a VM of a corresponding block. The receiving VM reallocates received data to corresponding CHIDs.

Referring to FIG. 8, the packet forwarded to the switch in FE-0 and FE-2 is transferred via an internal channel to VM-1. VM-1 then allocates the packet to the CHIDs.

The novel channel sharing will now be described in conjunction with FIG. 8. In FIG. 8, FIB/LIBs connected to the (FE-0, VM-0) and (FE-2, VM-2) is allocated with different internal channel IDs mapped with IP addresses. So, when packets of equal VPI and VCI and different CHIDs are introduced into switch 301 as illustrated in FIG. 8, the packets are transferred to VM-1 via a single channel 400 instead of using multiple channels, one for each source. This is different from the scenario of FIG. 2 where when each of (FE-0, VM-0), (FE-2, VM-2) and (FE-3, VM-3) forwards packets to (FE-1, VM-1), different channels (1, 2, 3) are used to deliver the packets from switch 210 to (FE-1, VM-1). By using different channels 1, 2, 3 in FIG. 2, the number of channels is disadvantageously large. Also, unnecessary resources are consumed to set up each of these channels between switch 210 and (FE-1, VM-1).

The present invention solves the problem of FIG. 2 by transferring the packets of equal VPI and VCI having different CHIDs using only a single channel 400. Therefore, the packets the packets from (FE-0, VM-0) and (FE-2, VM-2) are transferred in a package by sharing internal channel 400 from switch 301 to VM-1, the destination of transmission. By using a single channel 400 in FIG. 8 instead of many channels in FIG. 2, unnecessary channel setting is eliminated.

Figure 9:
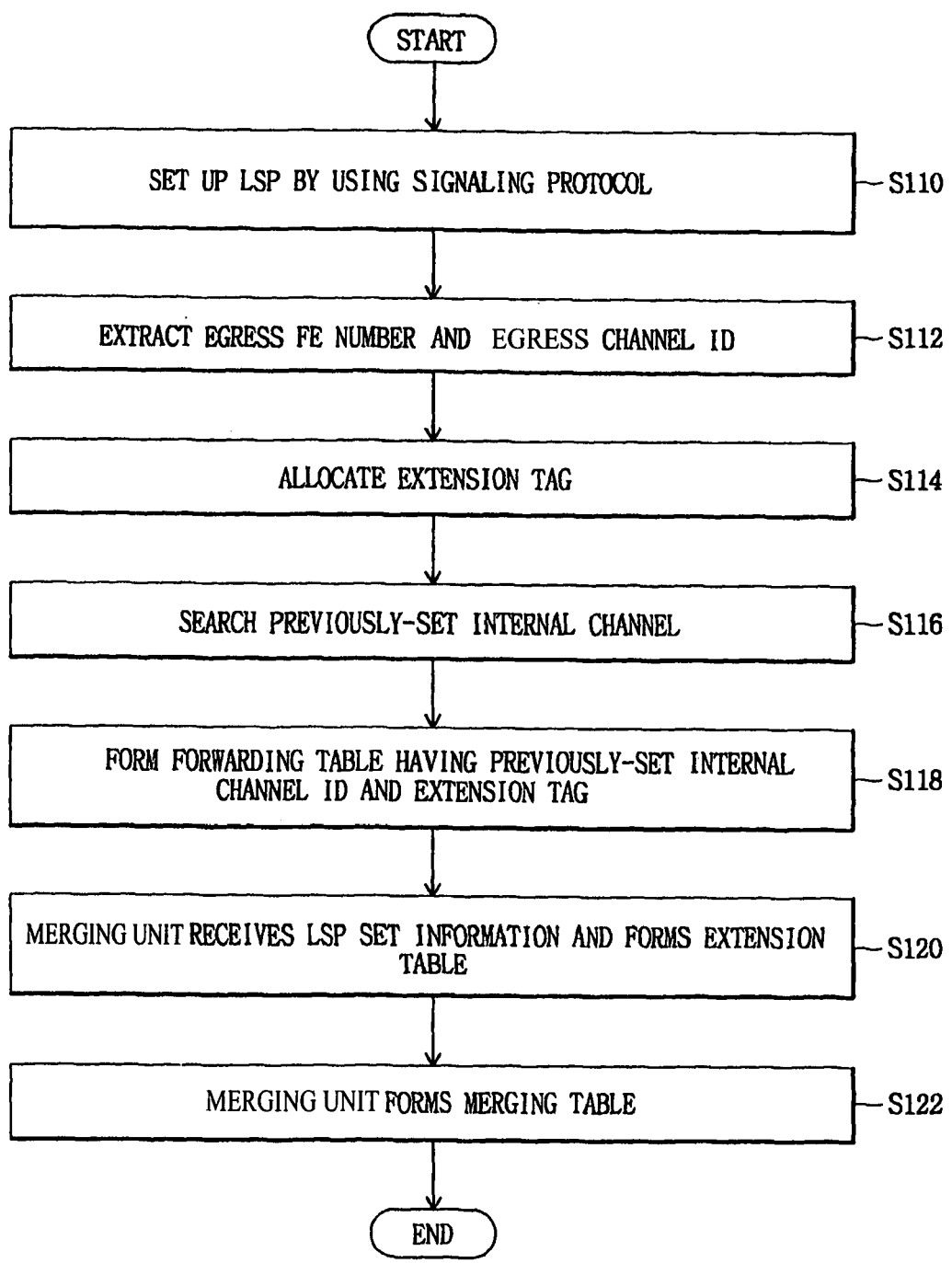
FIG. 9 is a flowchart illustrating the process for setting up the LSP in according to the principles of the present invention.

Turning to FIG. 9, FIG. 9 is a flowchart illustrating the process for setting up the LSP in accordance with the preferred embodiment of the present invention. As illustrated in FIG. 9, the main control unit 302 of the ingress LER registers the LSP having the destination address by the GSMP (S110). The main control unit 302 of the ingress LER searches the FE number of the egress LER from the registered LSP information, and also searches the internal channel ID corresponding to the destination IP address to which the FE of the egress LER transmits cells (S112). In addition to the FE number and the internal channel ID, the FE of the egress LER extracts and manages the VPI/VCI. Thereafter, the main control unit 302 of the ingress LER receives the extension tag for the internal channel ID used by the egress FE to transmit the ATM cells. Here, the main control unit 302 of the ingress LER receives the extension tag which has not been allocated to the other channel IDs (S114). The main control unit 302 of the ingress LER searches the previously-set internal channel to the corresponding egress FE in the VP mapping table (S116). Then, the main control unit 302 of the ingress LER generates the forwarding information base/label information base FIB/LIB table 323 having the searched internal channel ID and extension tag (S118). The main control unit 302 of the egress LER receives the LSP set information from the ingress main control unit 302, and generates and stores this information in an extension information base/merging table EIB/MT 335. Here, the internal channel ID is mapped to the extension tag in the extension information base/merging table EIB/MT 335 (S122).

Figure 10:
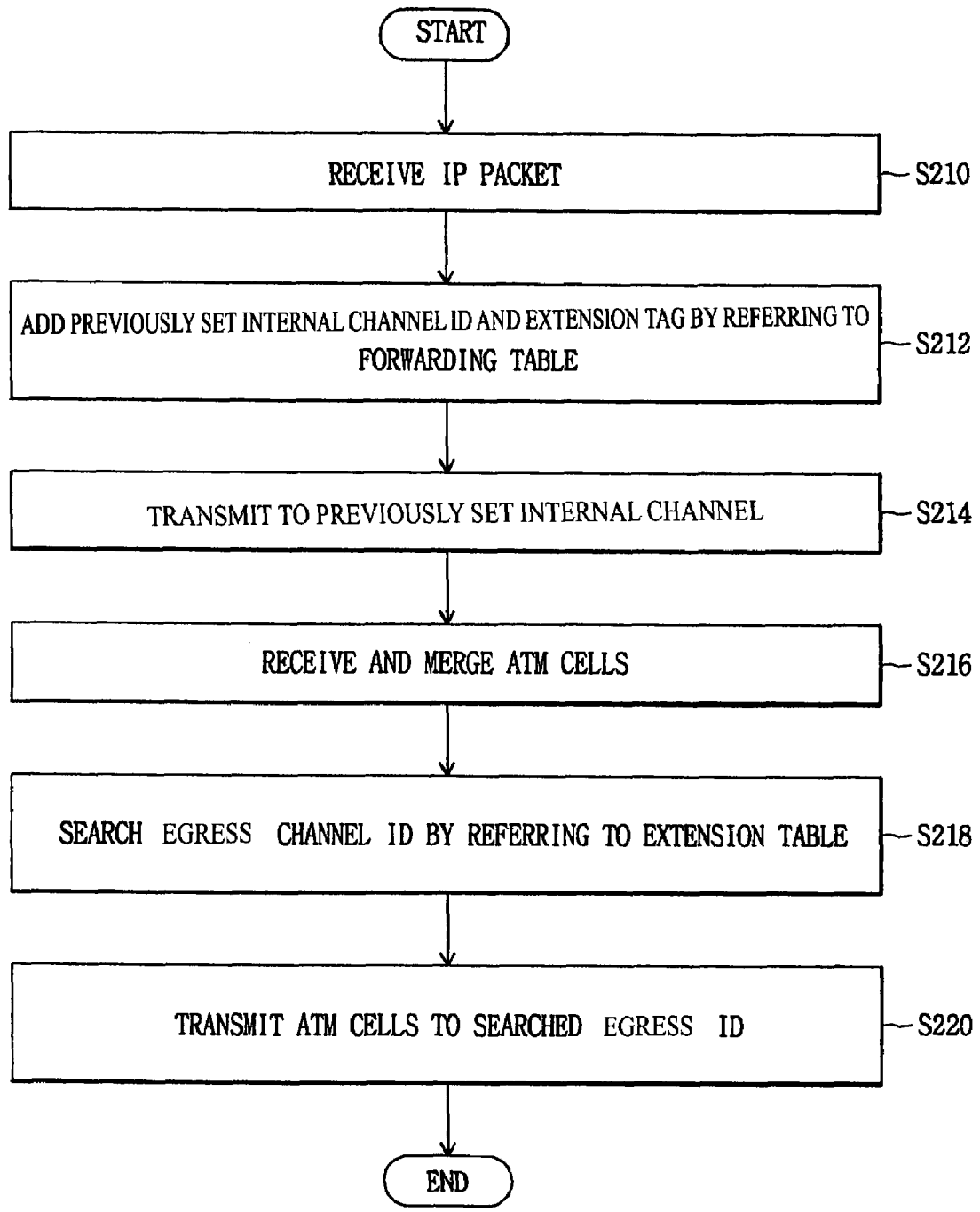
FIG. 10 is a flowchart illustrating a process for sharing an internal channel in according to the principles of the present invention.

Turning now to FIG. 10, FIG. 10 is a flowchart illustrating a process for sharing the internal channel in accordance with the preferred embodiment of the present invention. Referring to FIG. 10, when the procedure of setting up the LSP is finished, the FE of the ingress LER receiving the IP packet (S210) looks up the forwarding information base/label information base FIB/LIB 323, adds the allocated internal channel ID, the extension tag and the label to the IP packet (S212), and transmits it to the channel having the internal channel ID (S214). Here, the IP packet is segmented to ATM cells, and transmitted to the internal channel, and the switch performs switching according to the internal channel ID.

The FE of the egress LER merges the ATM cells from the same internal channel ID (S216), and searches the internal channel ID to which the ATM cells mapped to the extension tag will be transmitted by referring to the extension information base/merging table EIB/MT 335 (S218). Thereafter, the FE of the egress LER transmits the ATM cells having the same extension tag to the internal channel having the internal channel ID (S220).

On the other hand, the procedure of setting up the LSP has been described in this embodiment, but the procedure of setting up the IPOA PVC is performed in the same manner.

As discussed earlier, in the related art, when the external channel such as the LSP and the IPOA PVC is set up, resources of the MPLS network are consumed to set up the internal channel, thereby reducing the whole capacity of the MPLS network. In accordance with the present invention, the resources of the MPLS network can be efficiently used by sharing the internal channel.

While the invention has been illustrated and described with reference to a certain preferred embodiment thereof, it will be understood by those skilled in the art that various changes in form and details may be made therein without departing from the spirit and scope of the invention as defined by the appended claims.

What is claimed is:

1. A label switching router having an internal channel share function over an asynchronous transfer mode, comprising:

an ingress forwarding engine adapted to set up a label switched path by using a signaling protocol, extract an egress forwarding engine number of an egress forwarding engine and an egress channel identifier that identifies an egress channel, allocate an extension tag that comprises said egress forwarding engine number and said egress channel identifier, search a previously-set internal channel that connects the ingress forwarding engine to the egress forwarding engine, form a forwarding information base/label information base that comprises the extension tag and a previously-set internal channel identifier that identifies said previously-set internal channel, add a header having the previously-set internal channel identifier and the extension tag to a received Internet Protocol (IP) packet by referring to the forwarding information base/label information base, and forward the IP packet; and a merging unit adapted to receive label switched path set information from the ingress forwarding engine, form an extension information base/merging table wherein the egress channel identifier is mapped to the extension tag, perform merging upon receiving the IP packet having the extension tag, extract the extension tag, map the extension tag to the egress channel identifier, and forward the IP packet to the egress channel.

2. The label switching router of claim 1, the ingress forwarding engine being controlled by a main control unit, the main control unit being programmed and configured to set up the label switched path by using the signaling protocol, extract the egress forwarding engine number and the previously-set internal channel identifier stored in the forwarding information base/label information base, allocate the extension tag according to the set label switched path, and store the previously-set internal channel identifier and the allocated extension tag in the forwarding information base/label information base, wherein the ingress forwarding engine comprises:

the forwarding information base/label information base for storing and managing a destination IP address, the previously-set internal channel identifier, the extension tag and a label;

an SAR receiving unit for reassembling the received IP packet, and outputting the reassembled IP packet;

a lookup control unit for adding the header having the previously-set internal channel identifier, the extension tag and the label to the IP packet by referring to the forwarding information base/label information base, and outputting the IP packet; and an SAR transmitting unit receiving the IP packet having the previously-set internal channel identifier and the extension tag from the lookup control unit, confirming the previously-set internal channel identifier, and forwarding the IP packet to the previously-set internal channel.

3. The label switching router of claim 1, the merging unit being controlled by a main control unit, the main control unit being programmed and configured to receive the label switched path set information from the ingress forwarding engine, and form the extension information base/merging table where the egress channel identifier is mapped to the extension tag, wherein the merging unit comprises:

an extension information base/merging table mapping the egress channel identifier to the extension tag, and storing the mapped egress channel identifier;

an SAR receiving unit reassembling the received IP packet, and outputting the reassembled IP packet;

a lookup control unit programmed and configured to add the header having the egress channel identifier mapped to the extension tag to the IP packet by referring to the forwarding information base/label information base, and output the IP packet; and an SAR transmitting unit confirming the egress channel identifier in the lookup control unit, and forwarding the IP packet to the egress channel.

4. The router of claim 1, the extension tag being indicative of a destination IP address from the merging unit.

5. The router of claim 1, wherein packets originating from different sources and going to a common destination handled by the router are transferred to said common destination via a single previously-set internal channel.

6. The router of claim 5, said single previously-set internal channel is shared by packets from different sources to transmit packets to said common destination.

7. The router of claim 5, wherein only one previously-set internal channel is allocated to deliver packets to a given destination handled by said router.

8. The router of claim 1, where only one previously-set internal channel is used to handle all packets of said router having a common extension tag.

9. A method of sharing a previously-set internal channel by using a label switching router over an asynchronous transfer mode, the method comprising:

setting up a label switched path by using a signaling protocol, extracting an egress forwarding engine number that identifies an egress forwarding engine and an egress channel identifier that identifies an egress channel, allocating an extension tag that comprises the egress forwarding engine number and the egress channel identifier, and forming a forwarding information base/label information base by using the previously-set internal channel by an ingress forwarding engine, the previously-set internal channel connecting the ingress forwarding engine to the egress forwarding engine;

adding a header comprising the extension tag and a previously-set internal channel identifier that identifies said previously-set internal channel to a received Internet Protocol (IP) packet by referring to the forwarding information base/label information base, and forwarding the IP packet by the ingress forwarding engine;

receiving label switched path set information from the ingress forwarding engine, and forming an extension information base/merging table where an egress channel identifier is mapped the extension tag at a merging unit; and forwarding the received IP packet having the extension tag to the egress channel by referring to the extension information base/merging table at the merging unit.

10. The method of claim 9, wherein the setting up a label switched path by using a signaling protocol, extracting the egress forwarding engine number and the egress channel identifier, allocating the extension tag, and forming the forwarding information base/label information base by using the previously-set internal channel by the ingress forwarding engine comprises:

searching the previously-set internal channel, the forwarding information base/label information base comprising the previously-set internal channel identifier and the extension tag.

11. The method of claim 9, wherein the adding a header having the previously-set internal channel identifier and the extension tag to a received IP packet by referring to the forwarding information base/label information base, and forwarding the IP packet by the ingress forwarding engine step comprises:

reassembling the received IP packet, and outputting the reassembled IP packet;

adding the header having the previously-set internal channel identifier, the extension tag and the label to the IP packet by referring to the forwarding information base/label information base; and confirming the previously-set internal channel identifier, and forwarding the IP packet to the previously-set internal channel.

12. The method of claim 9, wherein the forwarding a received IP packet having the extension tag to an egress channel having the egress channel identifier mapped to the extension tag by referring to the extension information base/merging table at the merging unit step comprises:

performing merging upon receipt of the IP packet having the extension tag;

extracting the extension tag, and mapping it to the egress channel; and forwarding the IP packet to the egress channel having the mapped egress channel identifier.

13. The method of claim 9, the extension tag being indicative of the egress channel the IP packet is forwarded to from the merging unit.

14. The method of claim 9, only one previously-set internal channel is used to deliver all packets to a common destination.

15. The method of claim 9, only one previously-set internal channel is set up to deliver packets having a common extension tag.

16. The method of claim 9, only one previously-set internal channel is used to deliver packets to a single destination, even when the packets originate from diverse ingress forwarding engines in the label switching router.

17. The method of claim 9, only one previously-set internal channel is set up and serves as an only path to deliver packets from a plurality of ingress forwarding engines in the label switching router to a single destination in the label switching router.

* * * * *